United States Patent [19]
Crowe

[11] Patent Number: 5,352,398
[45] Date of Patent: Oct. 4, 1994

[54] APPARATUS AND METHOD FOR ATTACHING A CAP TO A MOLD CORE

[75] Inventor: Kevin P. Crowe, Rochester, N.Y.

[73] Assignee: Eastman Kodak Company, Rochester, N.Y.

[21] Appl. No.: 58,626

[22] Filed: May 6, 1993

[51] Int. Cl.⁵ .................. B28B 7/10; B29C 33/40; B29C 45/03; B29C 45/40
[52] U.S. Cl. .................. 264/219; 249/66.1; 264/328.1; 264/335; 425/437; 425/438; 425/468; 425/556; 425/577; 425/DIG. 102
[58] Field of Search ............ 264/335, 219, 328.1, 264/313, 314; 249/66.1, 144; 425/556, 577, 437, 438, 468, DIG. 10, DIG. 102, DIG. 243, DIG. 247

[56] References Cited

U.S. PATENT DOCUMENTS

| | | | |
|---|---|---|---|
| 847,253 | 3/1907 | Iversen et al. | |
| 2,140,132 | 12/1938 | Hollett | 280/33.15 |
| 2,571,641 | 10/1951 | Wing | 85/1 |
| 3,109,214 | 11/1963 | Clay | 24/221 |
| 3,584,111 | 6/1971 | Allison | 425/438 X |
| 4,129,395 | 12/1978 | Theurer et al. | 403/317 |
| 4,383,819 | 5/1983 | Letica | 425/577 |
| 4,438,065 | 3/1984 | Brown | 264/335 |
| 4,531,702 | 7/1985 | Plummer | 425/577 X |
| 4,632,657 | 12/1986 | Potoczky | 425/556 |
| 4,660,801 | 4/1987 | Schad | 249/66 A |
| 4,743,420 | 5/1988 | Dutt | 425/577 X |
| 4,764,103 | 8/1988 | Mitake | 425/556 X |

*Primary Examiner*—Karen Aftergut
*Attorney, Agent, or Firm*—Clyde E. Bailey

[57] ABSTRACT

A cap is attached to a mold core with a T-shaped connector instead of screws. The core cap has an air distribution channel and the core has cooling fluid distribution channels which are maximized by using the T-connector. The fluid distribution channels promote maximum cooling of the core, and, along with the air distribution channel, facilitates ejection of small articles from the mold.

16 Claims, 5 Drawing Sheets 5,352,398

APPARATUS AND METHOD FOR ATTACHING A CAP TO A MOLD CORE

FIELD OF THE INVENTION

The present invention generally relates an apparatus and method for molding an article and ejecting the molded article using compressed air, and, more particularly, to a method of attaching a cap to a mold core to facilitate molding and ejecting the article.

BACKGROUND OF THE INVENTION

In injection molding a cap is often attached to a mold core with either a fixed vent or a moveable vent which facilitates ejection of a molded plastic article from a mold with pressurized gas. Air ejection is commonly used in the high volume molding of plastic containers, especially food packaging, such as margarine tubs, for example. Air ejection is advantageous because it reduces mold cost and allows ejection of deep-walled containers that are not extractable by conventional means.

Ordinarily, the cap is attached to the mold core with screws or a threaded rod. A core cap fixedly attached by screws to a molding core for molding a workpiece is disclosed in U.S. Pat. No. 4,660,801 wherein there is a fluid channel formed at the interface of a core base and core sleeve for ejecting gaseous fluid to the peripheral surface of the mold core. Other types of molding cores, as disclosed in U.S. Pat. Nos. 4,438,065 and 4,632,657, for example, have embodied additional pneumatic means to initiate ejection of the workpiece from the core. Screws and rods do not lend themselves to the molding of relatively small diameter containers, such as 35 mm film cans, for example, because there is not sufficient room for mold cooling channels. Also, screws can weaken the mold core substantially thus shortening mold life. Accordingly, it will be appreciated that it would be highly desirable to attach a cap to a mold core without screws or rods.

It is possible to connect workpieces without conventional screws by using a T-shaped fastening device. U.S. Pat. No. 3,109,214 discloses T-shaped fastener which is a bolt having a top portion adapted to receive another member having a socket. The two members are fixedly attached by inserting a T-shaped key member into the two members and rotating the member to be joined relative to the bolt. U.S. Pat. Nos. 4,129,395; 2,571,641; 2,140,132 and 847,253 disclose the use of T-shaped fastening devices. Accordingly, it will be appreciated that it would be highly desirable to attach a cap to a mold core with a T-connector rather than screws or rods so that small diameter articles can be molded efficiently.

SUMMARY OF THE INVENTION

The present invention is directed to overcoming one or more of the problems set forth above. Briefly summarized, according to one aspect of the present invention, an apparatus is provided for molding and ejecting an article from an air eject mold wherein the mold has a core and sleeve between which the article is molded. The apparatus includes a T-shaped member having a boss thereon and being formed on an upper end portion of the core, and a cap member having a hole mateable with the boss, a closed rear wall and a relieved front wall. The front wall has a first slot for receiving the T-shaped member, a second slot larger than the first slot and concentric with the first slot for having the T-shaped member rotated therein into engagement with the cap member, and a third slot larger than the second slot and concentric with the first and second slots for providing an air distribution channel.

A pin is interposed between the cap and the T-shaped member to angularly orient the cap relative to the T-shaped member. Axial movement of the cap member relative to the T-shaped member is controlled by a fit tolerance between the T-shaped member and the second slot of the cap member. The T-shaped member is radially located relative to the cap member by rotating the T-shaped member in the second slot until the boss engages the boss mating hole.

According to another aspect of the invention, a method for attaching a cap to a core of a mold comprises forming a T-shaped member having a boss thereon on an upper end portion of the core, forming the cap member with a boss mating hole, a closed rear wall, and a relieved front wall having a first slot, and inserting the T-shaped member into the first slot. The front wall also has a second slot larger than said first slot and concentric with said first slot, and a third slot larger than said second slot and concentric with said first and second slots.

According to another aspect of the invention a method for ejecting a molded article from an air eject mold wherein the mold has a core and sleeve between which the article is molded includes forming a T-shaped member on an upper end portion of the core wherein the T-shaped member has a boss thereon, and forming a cap member having a boss mating hole, a closed rear wall and a relieved front wall with the front wall having a first slot, a second slot larger than the first slot and concentric with the first slot, and a third slot larger than the second slot and concentric with the first and second slots. The method includes inserting the T-shaped member into the first slot, placing a pin between the cap and the T-shaped member and angularly orienting the cap relative to the T-shaped member, controlling axial movement of the cap member relative to the T-shaped member by a fit tolerance between the T-shaped member and the second slot of the cap member, rotating the T-shaped member in the second slot until the boss engages the boss mating hole and radially locating the T-shaped member relative to the cap member, providing an air distribution channel in the third slot, molding the article, and introducing pressurized air into the distribution channel and forcibly separating the article from the core.

The present invention uses a blind T-slot which rotates into a final position, such as in a bayonet mount, to attach the cap, without the use of screws, to the end of the mold core. The cap provides an air passageway for allowing pressurized air to eject a molded article from the core. A pin holds the cap in its correct orientation. The cap is attached without screws making it useful for injection molding of small plastic containers.

These and other aspects, objects, features and advantages of the present invention will be more clearly understood and appreciated from a review of the following detailed description of the preferred embodiment and appended claims, and by reference to the accompanying drawings.

DETAILED DESCRIPTION OF THE PREFERRED EMBODIMENTS

Figure 1:
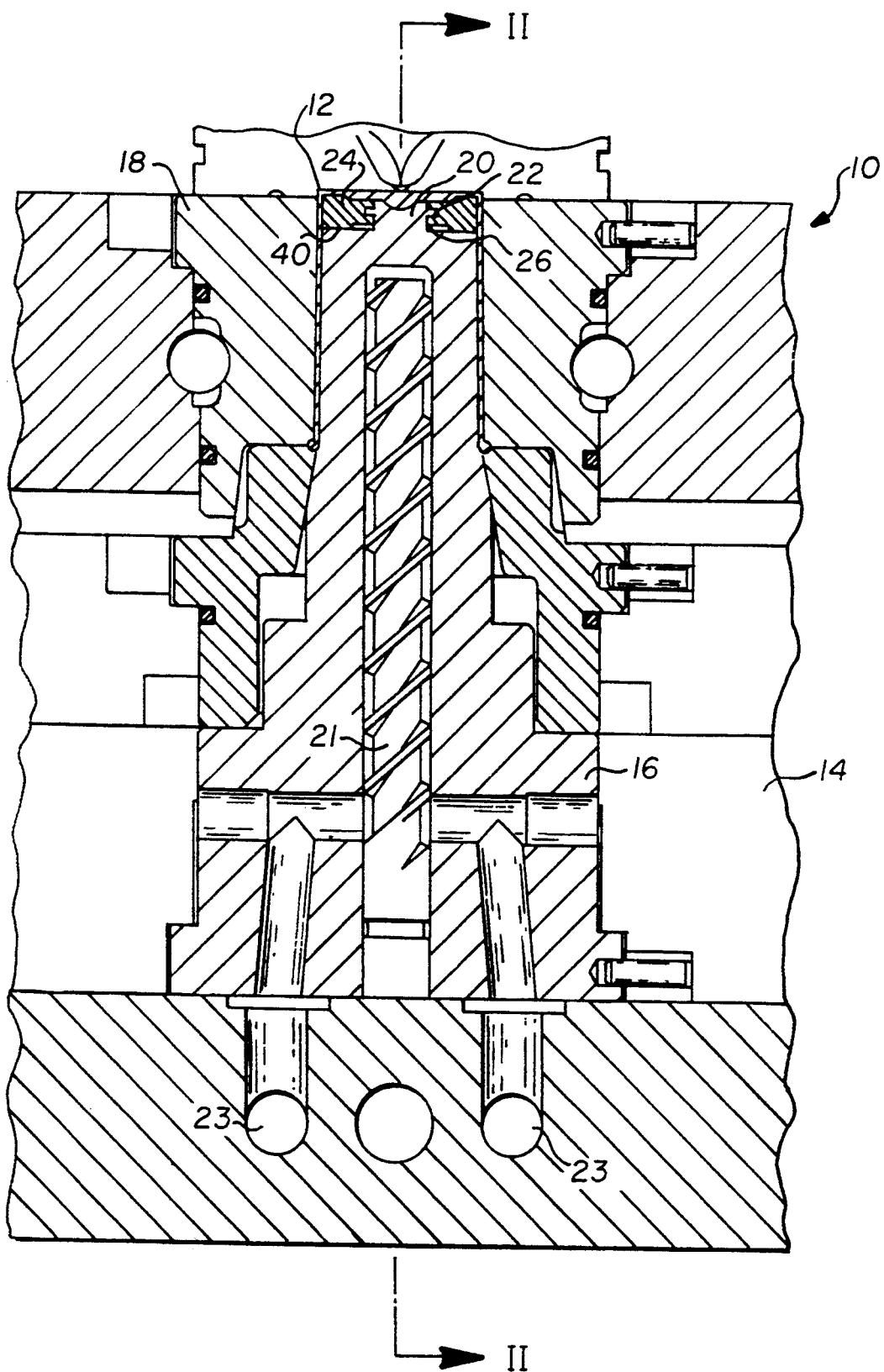
FIG. 1 is a longitudinal sectional view taken along line I—I of FIG. 2 illustrating a preferred embodiment of an apparatus for molding and ejecting an article from an air eject mold wherein the mold has a core and sleeve between which the article is molded.

Referring to FIGS. 1-2 and 7-8, an apparatus 10 for molding and ejecting an article 12 from an air eject mold 14 is illustrated. The mold 14 has a core 16 and a sleeve 18 between which the article 12 is molded. The core 16 also has a T-shaped member 20 with a boss 22 positioned on its upper end. Hot plastic material is injected into the cavity existing between the core 16 and sleeve 18. Temperature is controlled by circulating cooling fluid through fluid distribution channels 21 existing in the core 16 via a pump or other means (not shown) connected to ports 23.

Referring to FIGS. 1-7, a cap member 24 has an opening or hole 26 mateable with the boss 22 on the T-shaped member. The cap 24 also has a closed rear wall 28 and a relieved front wall 30. The front wall 30 has a first slot 32 for receiving the T-shaped member 20, a second slot 34 larger than the first slot 32 and concentric with the first slot 32 for having the T-shaped member 20 rotated therein into engagement with the cap member 24, and a third slot 36 larger than the second slot 34 and concentric with the first and second slots 32, 34 for providing an air distribution channel 38. The cap member 24 and the first and second slots 32, 34 are preferably circular.

The air distribution channel 38 receives pressurized air from a compressor or other source (not shown) via air intake port 39. Pressurized air is delivered by the distribution channel 38 to a vent 40 existing between the upper end portion of the core 16 and the cap 24. The vent 40 is formed at an interface of the cap member 24 and the upper end portion of the core 16. Preferably, the vent 40 is in communication with the air distribution channel 38 only when air pressure in the air distribution channel 38 exceeds a preselected value to thereby eject the article 12 out of the mold 14. The cap 24 moves away from the core 16 in response to air pressure in the channel 38 reaching a preselected value. The pressurized air slightly lifts the cap 24 which disengages the article 12 from the core 16 and ejects the article 12 from the cap 24.

Figure 2:
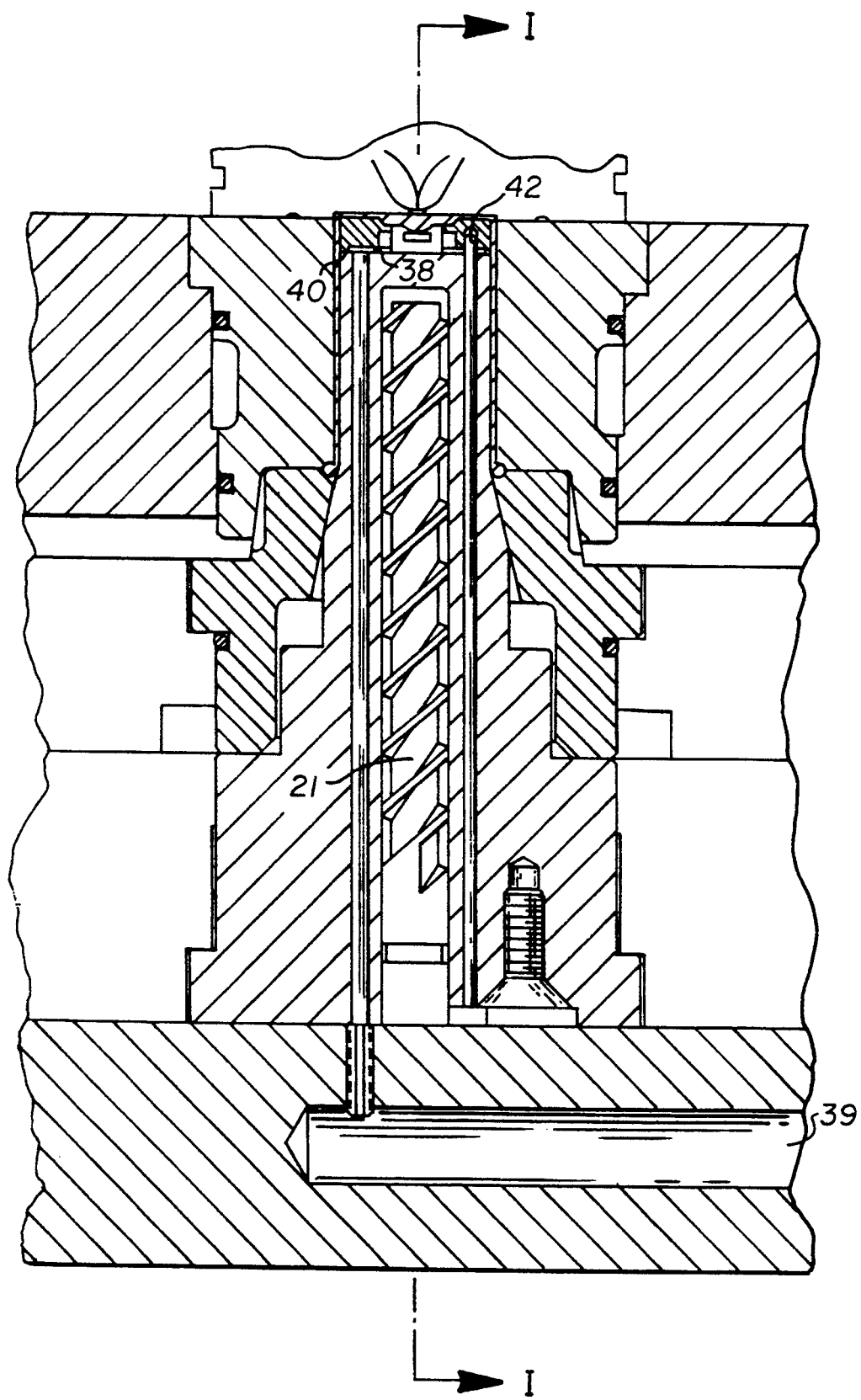
FIG. 2 is a longitudinal sectional view taken along line II—II of FIG. 1.
Figure 3:
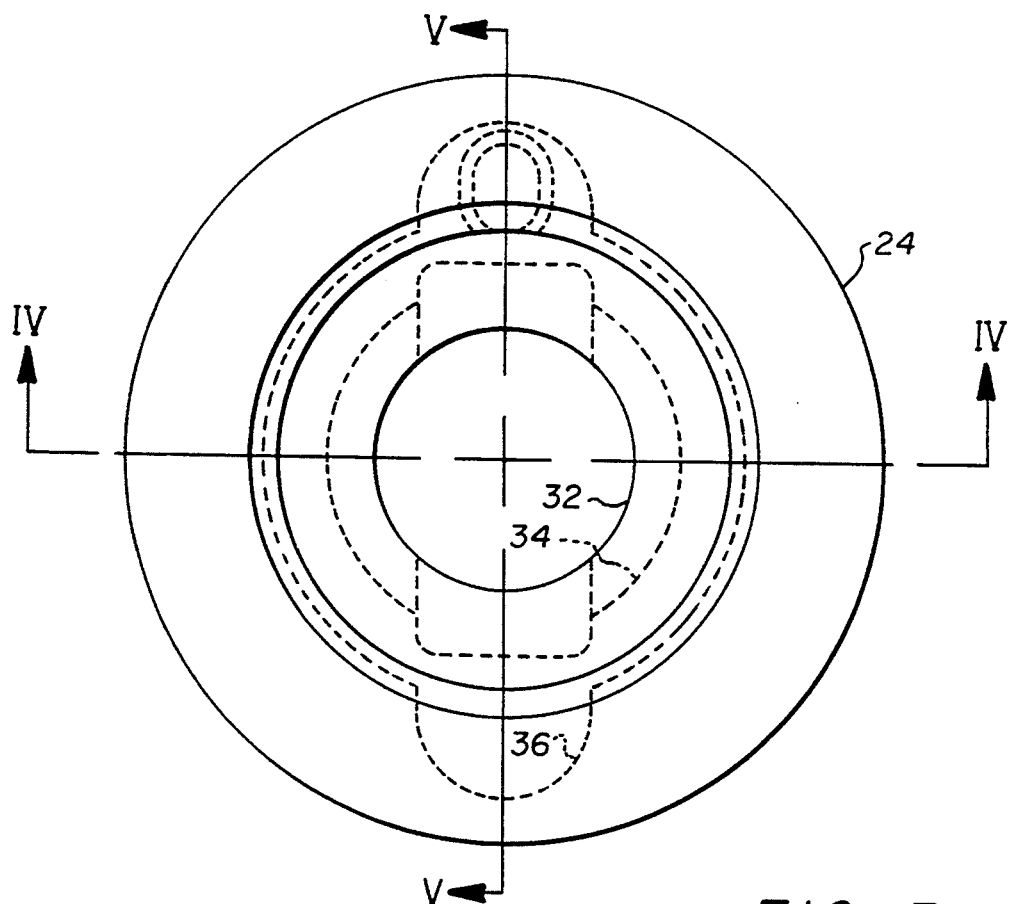
FIG. 3 is a top view of the cap member of the mold core of FIGS. 1 and 2.
Figure 4:
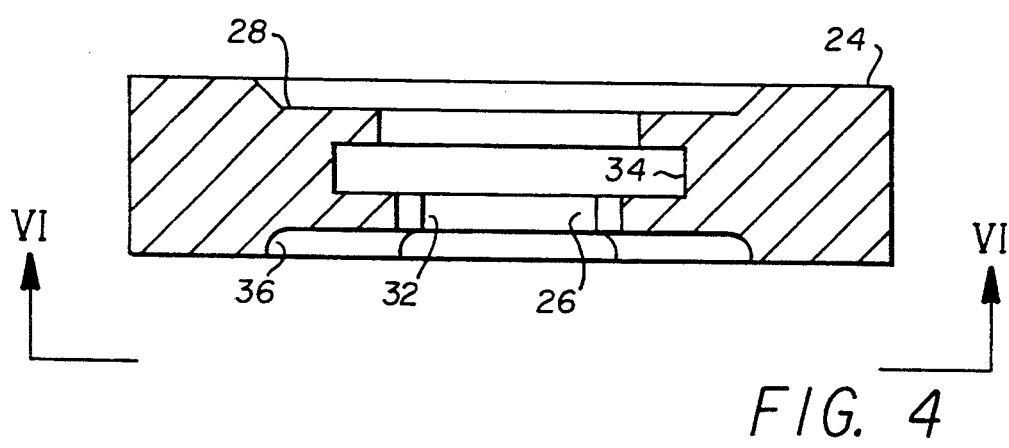
FIG. 4 is sectional view taken along line IV—IV of FIG. 3.
Figure 5:
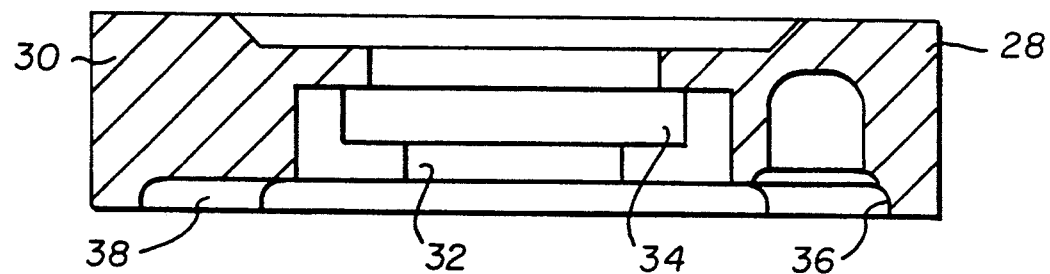
FIG. 5 is sectional view taken along line V—V of FIG. 3.
Figure 6:
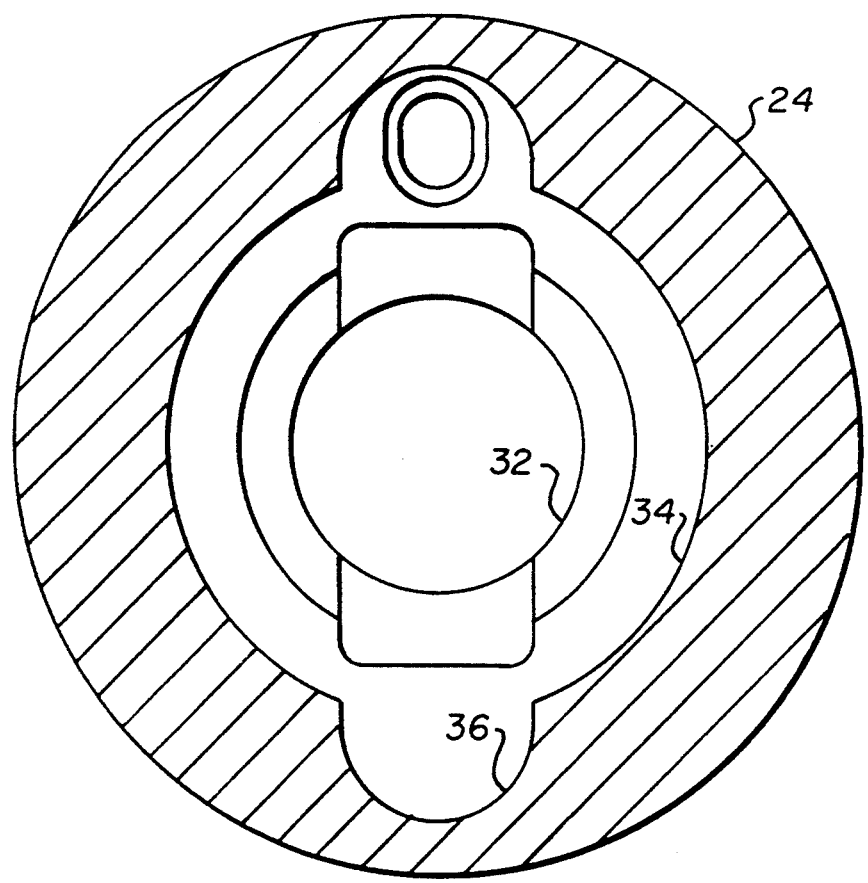
FIG. 6 is sectional view taken along line VI—VI of FIG. 4.
Figure 7:
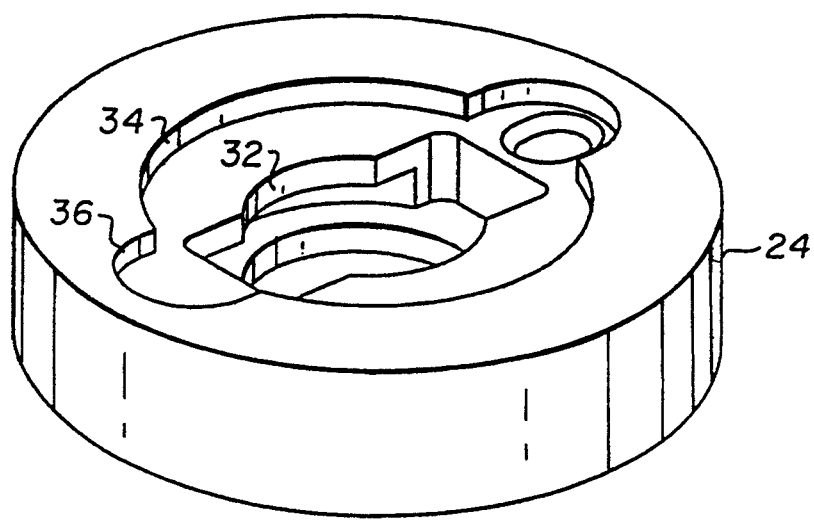
FIG. 7 is an isometric view of the cap member of the mold core of FIGS. 1 and 2.
Figure 8:
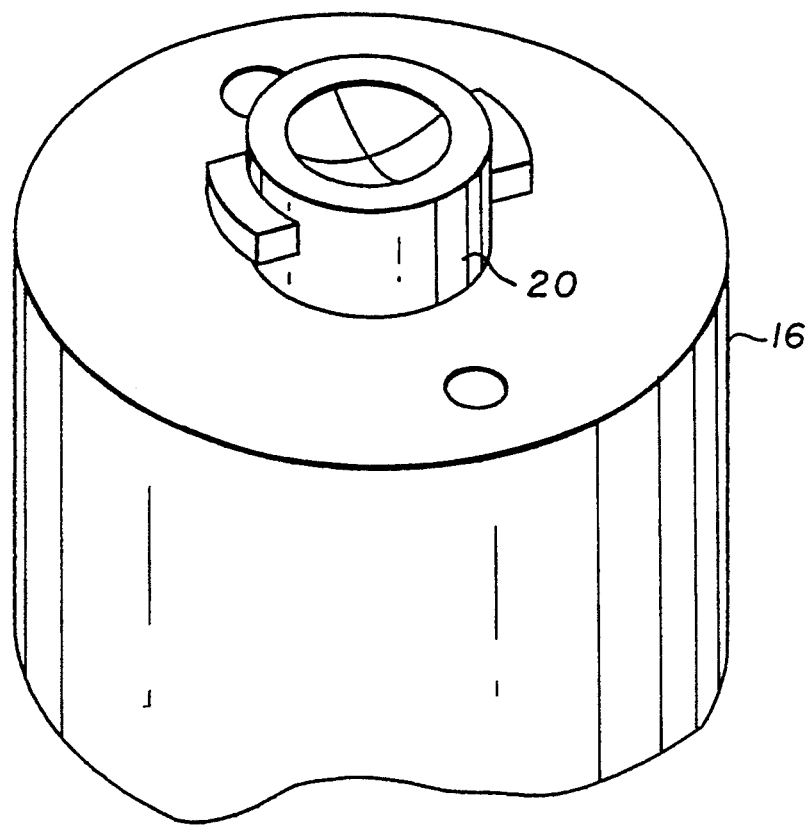
FIG. 8 is an isometric view of the mold core with the cap member removed.

As best shown in FIGS. 2, 3 and 5, a pin 42 is interposed between the cap 24 and the T-shaped member 20 to angularly orient the cap 24 relative to the T-shaped member 20.

Axial movement of the cap member 24 relative to the T-shaped member 20 is controlled by a fit tolerance between the T-shaped member 20 and the second slot 34 of the cap member 24. The T-shaped member 20 is radially located relative to the cap member 24 by rotating the T-shaped member 20 in the second slot 34 until the boss 22 engages the boss mating hole 26.

Operation of the present invention is believed to be apparent from the foregoing description and drawings, but a few words will be added for emphasis. The molding and ejecting apparatus is assembled by inserting the T-shaped member into the slot on the receiving side of the front wall of the cap. The cap has a blind circular slot which allows for some rotation between the T-member and the cap until the T-member is engaged in the blind circular slot. Axial movement of one component relative to the other is controlled by the fit tolerance between the T-member and the blind circular slot. Radial location is controlled by the boss. Angular orientation is achieved by placing a pin between the components.

After assembly the molding material is injected and the article desired is molded. Temperature is controlled by circulating cooling fluid through the fluid distribution channels. After forming the desired article, pressurized air is introduced into the air distribution channel to separate the article from the cap.

It can now be appreciated that there has been presented an apparatus and method for attaching a cap to a mold core without the use of rods or screws. The apparatus includes a T-shaped member having a boss thereon and being formed on an upper end portion of the core, and a cap member having a hole mateable with the boss, a closed rear wall and a relieved front wall, the front wall having a first slot for receiving the T-shaped member, a second slot larger than the first slot and concentric with the first slot for having the T-shaped member rotated therein into engagement with the cap member, and a third slot larger than the second slot and concentric with the first and second slots for providing an air distribution channel. A pin is interposed between the cap and the T-shaped member to angularly orient the cap relative to the T-shaped member. Axial movement of the cap member relative to the T-shaped member is controlled by a fit tolerance between the T-shaped member and the second slot of the cap member. The T-shaped member is radially located relative to the cap member by rotating the T-shaped member in the second slot until the boss engages the boss mating hole.

The method includes the steps of forming a T-shaped member on an upper end portion of said core; forming a cap member having a boss mating hole, a closed rear wall and a relieved front wall with the front wall having a first slot, a second slot larger than said first slot and concentric with said first slot, and a third slot larger than said second slot and concentric with said first and second slots; and inserting said T-shaped member into said first slot. The method includes placing a pin between the cap and the T-shaped and angularly orienting the cap relative to the T-shaped member, controlling axial movement of the cap member relative to the T-shaped member by a fit tolerance between the T-shaped member and the second slot of the cap member, rotating the T-shaped member in the second slot until the boss engages the boss mating hole and radially locating the T-shaped member relative to the cap member, providing an air distribution channel in the third slot, and introducing pressurized air into the distribution channel and forcibly separating the article from the cap member.

The core cap has a fluid distribution channel in an interior slot formed in the front wall of the cap. The cap moves during air ejection relative to the core base to eject the article. The problem of ejecting small articles from the mold is overcome because the method of attaching the cap to the base eliminates screws and related components which hamper maximum cooling ability when molding small articles.

It can also appreciated that the apparatus and method for attaching a cap to a mold core without the use of rods or screws provides certain advantages. Because screws are not used, there is no danger of loose screws which may allow the cap to become free during a molding cycle thereby ruining the molded article and possibly damaging the mold. There are fewer parts because screws are absent. Space is not wasted on bores for screws which provides more space for coolant passageways. Coolant passageways can be greater in number or the same in number but larger in size without increasing overall size of the core. Increased coolant passageway size permits faster cooling of the molded article thereby reducing cycle time, increasing productivity, and reducing manufacturing costs. Also, because size does not have to be increased to accommodate rods or screws, the apparatus can be used for 35 mm film cans and other small articles.

While the invention has been described with particular reference to a preferred embodiment, it will be understood by those skilled in the art that various changes may be made and equivalents may be substituted for elements of the preferred embodiment without departing from invention. In addition, many modifications may be made to adapt a particular situation and material to a teaching of the invention without departing from the essential teachings of the present invention.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

What is claimed is:

1. An apparatus for molding and ejecting an article from an air eject mold, said mold having a core and sleeve between which said article is molded, said apparatus comprising:
    a T-shaped member having a boss thereon and being formed on an upper end portion of said core; and
    a cap member having a hole mateable with said boss, a closed rear wall and a relieved front wall, said front wall having a first slot for receiving said T-shaped member, a second slot larger than said first slot and concentric with said first slot for having said T-shaped member rotated therein into engagement with said cap member, and a third slot larger than said second slot and concentric with said first and second slots for providing an air distribution channel for ejection of said article.

2. An apparatus, as set forth in claim 1 including a pin interposed between said cap member and said T-shaped member to angularly orient said cap member relative to said T-shaped member.

3. An apparatus, as set forth in claim 1 wherein axial movement of said cap member relative to said T-shaped member is controlled by a fit tolerance between said T-shaped member and said second slot of said cap member.

4. An apparatus, as set forth in claim 1, including a vent formed at an interface of said cap member and said upper end portion of said core, said vent being in communication with said air distribution channel when air pressure in said air distribution channel exceeds a preselected value.

5. An apparatus, as set forth in claim 1, wherein said T-shaped member is radially located relative to said cap member by rotating said T-shaped member in said second slot until said boss engages said boss mateable hole.

6. An apparatus, as set forth in claim 1, wherein said cap member moves away from said core in response to air pressure in said air distribution channel reaching a preselected value.

7. An apparatus, as set forth in claim 1, including a vent formed at an interface of said cap member and said upper end portion of said core, said cap member moving away from said core a small distance sufficient for dislodging said article from said core in response to air pressure in said air distribution channel reaching a preselected value, and said vent being in communication with said air distribution channel when said air pressure in said air distribution channel exceeds said preselected value to eject said article from said mold.

8. A method for attaching a cap member to a core of an air eject mold having a sleeve, an article being molded between said core and said sleeve, said method comprising the steps of:
    forming a T-shaped member on an upper end portion of said core, said T-shaped member having a boss thereon;
    forming a cap member having a boss mating hole, a closed rear wall and a relieved front wall, said front wall having a first slot for receiving said T-shaped member, a second slot larger than said first slot and concentric with said first slot for having said T-shaped member rotated therein into engagement with said cap member, and a third slot larger than said second slot and concentric with said first and second slots for providing an air distribution channel for ejection of said article; and
    inserting said T-shaped member into said first slot of said cap member and rotating said T-shaped member in said second slot into engagement with said cap member.

9. A method, as set forth in claim 8 including the steps of placing a pin between said cap member and said T-shaped member and angularly orienting said cap member relative to said T-shaped member.

10. A method, as set forth in claim 8 including the step of controlling axial movement of said cap member relative to said T-shaped member by a fit tolerance between said T-shaped member and said second slot of said cap member.

11. A method, as set forth in claim 8, including the steps of rotating said T-shaped member in said second slot until said boss engages said boss mating hole and radially locating said T-shaped member relative to said cap member.

12. A method, as set forth in claim 8, including the step of providing an air distribution channel in said third slot.

13. A method, as set forth in claim 12, including the steps of introducing pressurized air into said air distribution channel and forcibly separating said molded article from said cap member.

14. A method, as set forth in claim 12, including the steps of introducing pressurized air into said air distribution channel and forcibly moving said cap member away from said core a distance sufficient for dislodging said molded article from said core.

15. A method, as set forth in claim 12, including the steps of forming a vent between said cap member and said core and introducing pressurized air into said vent and forcibly separating said molded article from said core.

16. A method for ejecting a molded article from an air eject mold, said mold having a core and sleeve between which said article is molded, said method comprising the steps of:

forming a T-shaped member on an upper end portion of said core, said T-shaped member having a boss thereon;

forming a cap member having a boss mating hole, a closed rear wall and a relieved front wall, said front wall having a first slot for receiving said T-shaped member, a second slot larger than said first slot and concentric with said first slot for having said T-shaped member rotated therein into engagement with said cap member, and a third slot larger than said second slot and concentric with said first and second slots for providing an air distribution channel for ejection of said article;

inserting said T-shaped member into said first slot;

placing a pin between said cap member and said T-shaped member and angularly orienting said cap member relative to said T-shaped member;

controlling axial movement of said cap member relative to said T-shaped member by a fit tolerance between said T-shaped member and said second slot of said cap member;

rotating said T-shaped member in said second slot until said boss engages said boss mating hole and radially locating said T-shaped member relative to said cap member;

providing an air distribution channel in said third slot;

molding said article between said core having said cap member thereon and said sleeve of said air eject mold; and introducing pressurized air into said air distribution channel and forcibly separating said molded article from said core.

* * * * *